United States Patent
Gray et al.

(10) Patent No.: US 12,106,333 B2
(45) Date of Patent: *Oct. 1, 2024

(54) MEDIA PROCESSING TECHNIQUES FOR ENHANCING CONTENT

(71) Applicant: A9.com, Inc., Palo Alto, CA (US)

(72) Inventors: Douglas Ryan Gray, Mountain View, CA (US); Arnab Sanat Kumar Dhua, Mountain View, CA (US); Xiaofan Lin, Palo Alto, CA (US); Zhijiang Mark Lu, Union City, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,806

(22) Filed: May 23, 2023

(65) Prior Publication Data

US 2023/0298073 A1    Sep. 21, 2023

Related U.S. Application Data

(63) Continuation of application No. 17/170,010, filed on Feb. 8, 2021, now Pat. No. 11,699,174, which is a continuation of application No. 14/203,260, filed on Mar. 10, 2014, now Pat. No. 10,963,924.

(51) Int. Cl.
*G06Q 30/00* (2023.01)
*G06F 40/14* (2020.01)
*G06Q 30/0241* (2023.01)

(52) U.S. Cl.
CPC ......... *G06Q 30/0277* (2013.01); *G06F 40/14* (2020.01)

(58) Field of Classification Search
None
See application file for complete search history.

(56) References Cited

U.S. PATENT DOCUMENTS

| | | | |
|---|---|---|---|
| 5,991,713 | A | 11/1999 | Unger |
| 6,161,082 | A | 12/2000 | Goldberg |
| 6,859,909 | B1 | 2/2005 | Lerner |
| 7,117,152 | B1 | 10/2006 | Mukherji |
| 7,149,981 | B1 | 12/2006 | Lundy |
| 7,559,034 | B1 | 7/2009 | Paperny |

(Continued)

OTHER PUBLICATIONS

Non-Final Office Action issued in U.S. Appl. No. 14/203,232, dated Jan. 14, 2016.

(Continued)

*Primary Examiner* — Naresh Vig
(74) *Attorney, Agent, or Firm* — Hogan Lovells US LLP

(57) ABSTRACT

A computing device can obtain data describing at least one document, the at least one document referencing at least one media object, wherein a portion of the at least one media object includes one or more characters. The computing device can obtain data describing the one or more characters in the at least one media object in the at least one document. The computing device can generate an updated copy of the at least one document that includes the data describing the one or more characters in the at least one media object. The computing device can present, on a display screen of the computing device and through an interface, the updated copy of the at least one document, wherein the one or more characters in the at least one media object are able to be selected or searched.

20 Claims, 8 Drawing Sheets

(56) References Cited

U.S. PATENT DOCUMENTS

| | | |
|---|---|---|
| 9,141,607 B1 | 9/2015 | Lee |
| 9,367,848 B2 | 6/2016 | Salles |
| 9,384,408 B2 | 7/2016 | Everingham |
| 9,503,499 B1 | 11/2016 | Donaldson |
| 9,569,465 B2 | 2/2017 | Folkens |
| 2002/0032701 A1 | 3/2002 | Gao et al. |
| 2002/0124025 A1 | 9/2002 | Janakiraman |
| 2005/0018216 A1 | 1/2005 | Barsness |
| 2007/0220009 A1 | 9/2007 | Morris |
| 2008/0028302 A1 | 1/2008 | Meschkat |
| 2008/0130041 A1 | 6/2008 | Asahara |
| 2009/0148045 A1 | 6/2009 | Lee |
| 2010/0172590 A1 | 7/2010 | Foehr |
| 2011/0313754 A1 | 12/2011 | Bastide |
| 2012/0030014 A1* | 2/2012 | Brunsman .......... G06Q 30/0251 705/14.49 |
| 2012/0030015 A1* | 2/2012 | Brunsman .......... G06Q 30/0251 705/14.49 |
| 2012/0221932 A1 | 8/2012 | Gleadall |
| 2012/0278341 A1 | 11/2012 | Ogilvy |
| 2014/0007149 A1 | 1/2014 | Huang |
| 2014/0023274 A1 | 1/2014 | Barman |
| 2014/0122998 A1 | 5/2014 | Shin |
| 2014/0201180 A1 | 7/2014 | Fatourechi |
| 2014/0229296 A1* | 8/2014 | Ye ..................... G06Q 30/0276 705/14.72 |
| 2014/0240523 A1 | 8/2014 | Dodla |
| 2014/0278997 A1 | 9/2014 | Kishi |
| 2015/0206169 A1 | 7/2015 | Ye |

OTHER PUBLICATIONS

Final Office Action issued in U.S. Appl. No. 14/203,232, dated Jun. 1, 2016.
Non-Final Office Action issued in U.S. Appl. No. 14/203,232, dated Oct. 13, 2016.
Final Office Action issued in U.S. Appl. No. 14/203,232, dated Mar. 30, 2017.
Non-Final Office Action issued in U.S. Appl. No. 14/203,232, dated Jan. 9, 2018.
Final Office Action issued in U.S. Appl. No. 14/203,232, dated Jul. 2, 2018.
Non-Final Office Action issued in U.S. Appl. No. 14/203,232, dated Jan. 4, 2019.
Non-Final Office Action issued in U.S. Appl. No. 14/203,232, dated Jun. 17, 2019.
Non-Final Office Action issued in U.S. Appl. No. 14/203,260, dated Apr. 8, 2016.
Final Office Action issued in U.S. Appl. No. 14/203,260, dated Dec. 27, 2016.
Non-Final Office Action issued in U.S. Appl. No. 14/203,260, dated May 14, 2018.
Non-Final Office Action issued in U.S. Appl. No. 14/203,260, dated Oct. 25, 2018.
Final Office Action issued in U.S. Appl. No. 14/203,260, dated May 13, 2019.
Final Office Action issued in U.S. Appl. No. 14/203,260, dated Aug. 14, 2019.
Final Office Action issued in U.S. Appl. No. 14/203,260, dated Apr. 15, 2020.
Notice of Allowance issued in U.S. Appl. No. 14/203,260, dated Oct. 14, 2020.
Notice of Allowance issued in U.S. Appl. No. 14/203,260, dated Nov. 30, 2020.
U.S. Appl. No. 61/975,691, Folkens et al., filed Apr. 4, 2014 (Year: 2014).
U.S. Appl. No. 61/956,927, Folkens et al., filed May 1, 2013 (Year: 2013).
Eric Enge, A Comprehensive Guide to Hidden Text & Search Engines, Oct. 7, 2007, www.moz.com (Year: 2007).
Sara Soueidan, CSS Overlay Techniques, Nov. 7, 2013, Codrops (Year: 2013).
William Staff, What is tag?, Nov. 27, 2008, (Year: 2008).
Chris Hoffman, What Parents Need to Know About Web Filtering and Parental Controls, Dec. 11, 2013, www.howtogeek.com Year: 2013).
Information on W3 School, 2013, www.w3school.com (printed through www.archive.org) (Year: 2013).
Non-Final Office Action issued in U.S. Appl. No. 17/170,010, dated Feb. 3, 2023.
Notice of Allowance issued in U.S. Appl. No. 17/170,010, dated Mar. 6, 2023.
Non-Final Office Action issued in U.S. Appl. No. 14/203,208, dated Feb. 1, 2016.
Final Office Action issued in U.S. Appl. No. 14/203,208, dated Jul. 28, 2016.
Non-Final Office Action issued in U.S. Appl. No. 14/203,208, dated Mar. 10, 2017.
Non-Final Office Action issued in U.S. Appl. No. 14/203,208, dated Sep. 19, 2017.
Final Office Action issued in U.S. Appl. No. 14/203,208, dated Apr. 20, 2018.
Non-Final Office Action issued in U.S. Appl. No. 14/203,208, dated Oct. 2, 2018.
Final Office Action issued in U.S. Appl. No. 14/203,208, dated Sep. 5, 2019.

* cited by examiner

MEDIA PROCESSING TECHNIQUES FOR ENHANCING CONTENT

CROSS REFERENCE TO RELATED APPLICATIONS

This application is a continuation of U.S. application Ser. No. 17/170,010, filed Feb. 8, 2021, now U.S. Pat. No. 11,699,174, which is a continuation of U.S. application Ser. No. 14/203,260, filed Mar. 10, 2014, now U.S. Pat. No. 10,963,924, both of which are entitled "MEDIA PROCESSING TECHNIQUES FOR ENHANCING CONTENT," the entire disclosures of which are hereby incorporated by reference herein for all intents and purposes.

BACKGROUND

As the number of users viewing information and purchasing items electronically increases, there is a corresponding increase in the amount of advertising revenue spent in electronic environments. In some cases, advertisements are specifically selected for certain pages or other interfaces displayed to a user. In other cases, these advertisements are selected based on content that can be displayed in any of a number of different pages. For example, a user might search for information about a keyword through a search engine. When a results page is returned to the user that includes search results relating to that keyword, at least one advertisement can be included with the results page that relates to the keyword and/or search results. Often, the advertisement includes a hypertext link or other user-selectable element that enables the user to navigate to another page or display relating to the advertisement.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome deficiencies in conventional approaches to selecting and searching for text that is in images or videos that are referenced in a document, e.g., a webpage. In particular, various embodiments of the present disclosure can provide a method for extracting text from images or videos in a document and incorporating the extracted text in the document. The extracted text can then be used for various purposes, such as to provide advertising related to the content of the images or videos.

Further, various embodiments of the present disclosure can also provide a method for extracting text from images or videos in a document and associating the extracted text with the respective image, video, or the document in which the image or video is referenced. Additionally, objects in the images or videos in the document can also be extracted and tags describing the extracted objects can be obtained and be associated with the respective image, video, or the document in which the image or video is referenced. The extracted text and/or tags can be used to obtain electronic advertisements that are relevant to the content in the images or videos in the document.

Additionally, various embodiments of the present disclosure can provide a method for extracting text from images or videos in a document and incorporating the extracted text in the document. Additionally, objects in the images or videos in the document can also be extracted and tags describing the extracted objects can be obtained and be incorporated in the document. The extracted text and/or tags can be used to obtain electronic advertisements that are relevant to the content in the images or videos in the document.

Other advantages, variations, and functions are described and suggested below as may be provided in accordance with the various embodiments.

Figure 1:
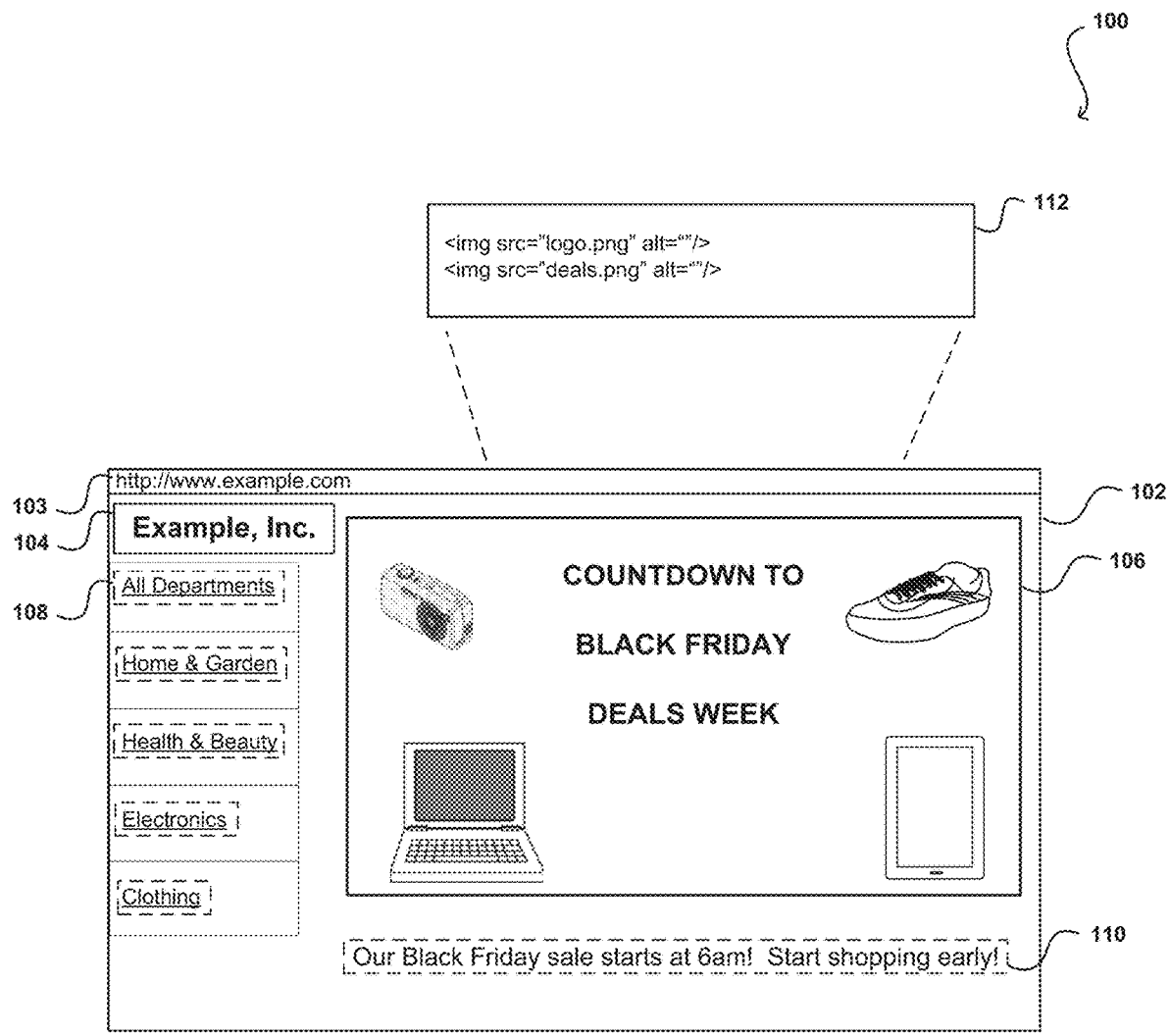
FIG. 1 illustrates an example interface that is presenting web content.

FIG. 1 illustrates an example interface 102 that is presenting web content. For example, the interface 102 is a graphical user interface of a software application, e.g., a web browser, that is running on a computing device, e.g., the computing device 702, as described in reference to FIG. 7. The software application can be configured to obtain content from a resource, e.g., a web server, and to render that content on a display screen of the computing device.

In FIG. 1, the interface 102 is presenting content that was obtained from a website being that is hosted by a web server in response to accessing a Uniform Resource Locator (URL) 103, e.g., "www.example.com," that references the website through the interface 102. The obtained content can include one or more documents, e.g., webpages, that are written in plain text and are optionally formatted using a markup language, for example, a Hypertext Markup Language, e.g., HTML or XHTML.

For example, FIG. 1 illustrates an example portion 112 of markup language code that can be used to describe the website content being presented in the interface 102. The portion 112 includes markup tags, e.g., HTML tags, that reference the image 104, e.g., "logo.png," and the image 106, e.g., "deals.png" that are both shown in the interface 102. The website may also include various forms of media including images and videos. As shown in FIG. 1, the content presented interface 102 includes an image 104 of a website logo and an image 106 that includes both graphics and text. The content also includes hyperlinks 108 and other text 110 that are written in plain text.

A user interacting with the interface 102 is generally able to select portions of the content shown in the interface 102. For example, the user can use a mouse to highlight the text 110 or the image 106 in the content. Once highlighted, the user is then able to perform other options for interacting with the text 110. For example, the user can select an option to cut or copy the text 110. Generally, when available, the cut operation removes the selected content from its original location and the copy operation copies the selected text. In both instances, the cut or copied content is typically placed in a buffer, e.g., a clipboard. The cut or copied content can then be pasted from the buffer to a different location, e.g., in a separate file or on a desktop. For illustrative purposes, in FIG. 1, the text that would typically be selectable by the user, e.g., the text 108 and 110, is shown as having a dotted line as a border. In contrast, the text in the images 104 and 106 is generally not selectable by the user because this text is part of the image itself. In this example, the user is able to copy the entire image 104 or image 106, but not the text, e.g., "Example, Inc." or "Countdown to Black Friday Deals Week," in the respective images 104 and 106. Additionally, when searching for text in the webpage, the user would typically not be able to search for text that is in the images 104 and 106. For example, in FIG. 1, a text search for "countdown" would not return any matching results.

Thus, in some embodiments, the content presented in the interface 102 is processed using various techniques, as described below, so that text in an image, e.g., "Countdown to Black Friday Deals Week" is able to be extracted. For example, the text may be extracted to allow the user to select the text in the image, for example, for purposes of copying and pasting, or to search for the text in the image using, for example, a search or find operation. Depending on the implementation, the extracted text may be searched in the current document, e.g., webpage, through search engines, or both. In some embodiments, the content presented in the interface 102 is processed using various techniques, as described below, to extract text and objects in the images. The extracted text and objects can then be used to identify relevant electronic advertisements ("ads") to be presented along with the content, as described below.

Figure 2:
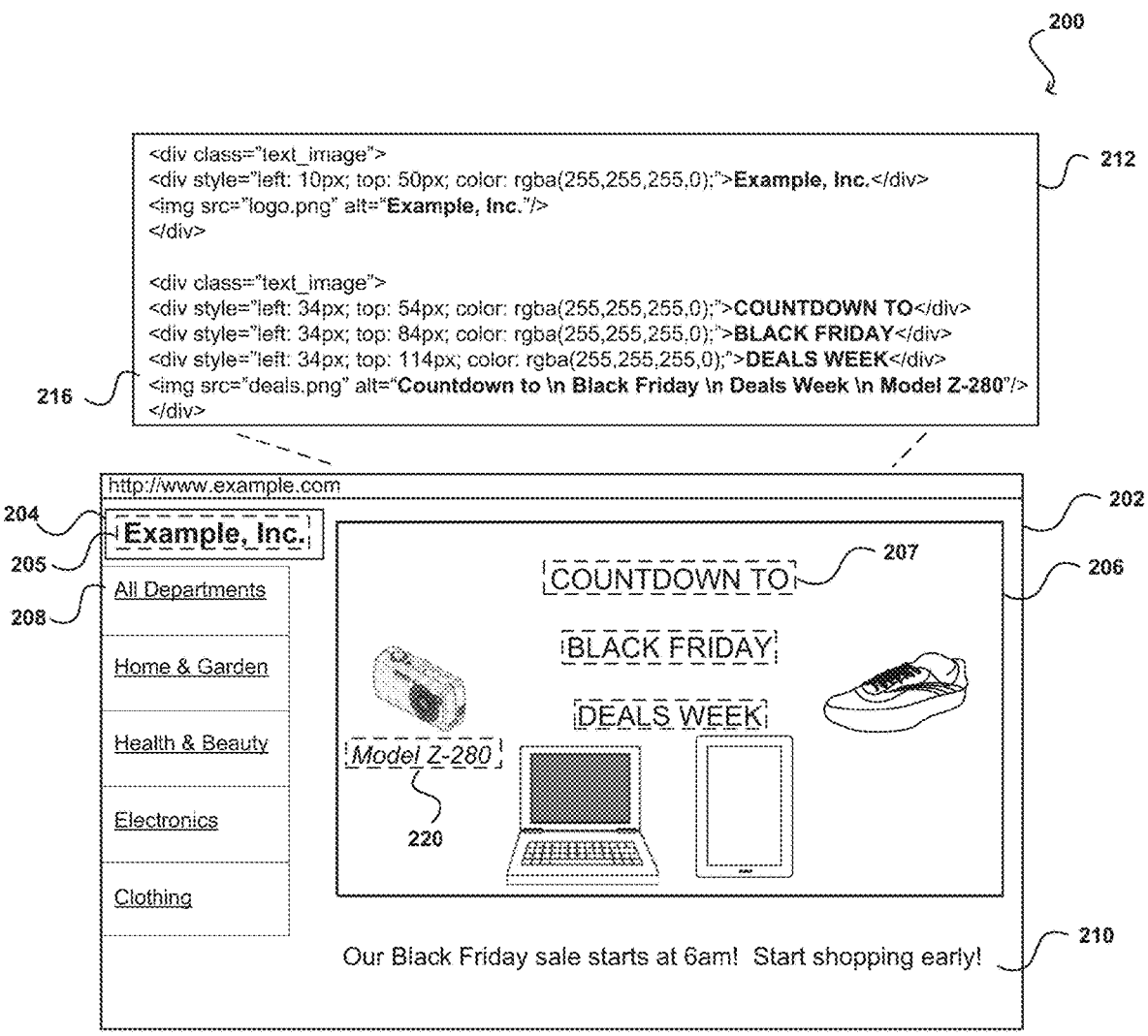
FIG. 2 illustrates an example interface that is presenting processed web content.

FIG. 2 illustrates an example interface 202 that is presenting processed web content. For example, the interface 202 is a graphical user interface of a software application, e.g., a web browser, that is running on a computing device, e.g., the computing device 702, as described in reference to FIG. 7. The software application can be configured to obtain content from a resource, e.g., a web server, and to render that content on a display screen of the computing device.

In FIG. 2, the interface 202 is presenting content that was obtained from the website that was described in reference to FIG. 1. However, in FIG. 2, the website has been processed to extract text from images, e.g., the image 204 and the image 206, that are included in the website. The processed website content in FIG. 2 is presented in the interface 202 and includes an image 204 of a website logo and an image 206 that includes both graphics and text. The content also includes hyperlinks 208 and other text 210 that are written in plain text.

As described above, a user interacting with the interface 202 is generally able to select portions of the content shown in the interface 202. For example, the user can use a mouse to highlight the text 210 or the image 206 in the content. Once highlighted, the user is then able to perform other options for interacting with the selected content. In some embodiments, the content being presented in the interface 202 is processed so that text included in media, e.g., images and videos, in the website is extracted. The extracted text is then is able to be selected or searched. Text can be extracted from media included in the website using generally known text detection and optical character recognition (OCR) techniques.

Thus, in FIG. 2, the user is able to select or search for the text 205, i.e., "Example, Inc.," in the image 204. Similarly, the user is able to select or search for the text 207, i.e., "Countdown to Black Friday Deals Week," and the text 220, i.e., "Model Z-280," in the image 206. For illustrative purposes, in FIG. 2, the text 205, the text 207, and the text 220 are shown as having a dotted line to emphasize that such text is now selectable or searchable after processing the content using the various techniques described herein. Naturally, the text hyperlinks 208 and the text 210 are still selectable and searchable since they are already in plain text.

As described above, a website can include documents, e.g., webpages, that are written in plain text and are optionally formatted using a markup language, for example, a Hypertext Markup Language, e.g., HTML or XHTML. In some embodiments, once text in website media, e.g., images and videos, has been extracted, the markup language used to describe the website is updated to allow the selection, searching, or both, of the extracted text.

For example, FIG. 2 illustrates an example portion 212 of markup language code that can be used to allow the selection, searching, or both, of the text extracted from the website being presented in the interface 202. The portion 212 includes a markup tag, i.e., an "img src" tag, that references the image 204, i.e., "logo.png." The markup language code also includes additional tags that describe the text 205, i.e., "Example Inc.," that was extracted from the image 204. For example, the extracted text can be included as an invisible overlay on top of the image from which the text was extracted, thereby allowing the extracted text to be copied directly from the image itself. In some embodiments, the markup language code is updated to describe the extracted text using a "div" tag. One example of such markup language code is reproduced below:

<div class="text_image">
<div style="left: 10 px; top: 50 px; color: rgba(255,255,255,0);">Example, Inc.</div>
</div>

As shown in the example markup language code above, the extracted text 205, i.e., "Example, Inc.," can be included in the markup language code of the website so that the text 205 is, for example, selectable or searchable by the user. The positioning of the text 205 can be adjusted using parameters, e.g., "left: 10 px," that are associated with the "div" tag, so that the text 205 added using the "div" tag is aligned with the text as it is shown in the image 204. In some embodiments, the markup language code is updated to describe the extracted text using an "alt" attribute. One example of such markup language code is reproduced below:

<img src="logo.png" alt="Example, Inc."/>

In some embodiments, the interface 202, e.g., the web browser, is configured so that text that is described using an "alt" attribute is selectable, for example, using a mouse, through the interface 202.

Similarly, the example portion 212 includes markup language code to describe the text 207 that is extracted from the image 206. One example of such markup language code is reproduced below:

<div class="text_image">
<div style="left: 34 px; top: 54 px; color: rgba(255,255,255,0);">COUNTDOWN TO</div>
<div style="left: 34 px; top: 84 px; color: rgba(255,255,255,0);">BLACK FRIDAY</div>
<div style="left: 34 px; top: 114 px; color: rgba(255,255,255,0);">DEALS WEEK</div>
</div>

As shown in the example markup language code above, the extracted text 207, i.e., "Countdown to Black Friday Deals Week," can be included in the markup language code of the website so that the text 207 is, for example, selectable or searchable. The positioning of the text 207 can be adjusted using parameters, e.g., "top: 50 px," that are associated with the "div" tag, so that the text 207 added using the "div" tag is aligned with the text as it is shown in the image 206. Further, multiple "div" tags may be used to place the text across multiple lines, as shown in FIG. 2. Similarly, the extracted text 220, i.e., "Model Z-280," can also be included in the markup language code of the website, as described above, so that the text 220 is, for example, selectable or searchable. In some embodiments, extracted text, or a portion thereof, can be included in the markup language code using the keyword meta tags.

In some embodiments, an option can be provided, for example, in a pop-up menu available through the interface 202, that allows translation of text that was extracted from media. For example, if a website included an image of a street sign having the text "Achtung," then, upon updating the markup language code for the website, a user would be able to select the text "Achtung" from the image. The user may then also select an option to obtain a translation of the selected text "Achtung" in the user's preferred language. In some embodiments, techniques, e.g., in-place text replacement or mouse-over prompts, can be used to convert the extracted text to a user's native language.

In some instances, a website may contain a video that includes text. In such instances, text extraction can be performed on the video to obtain text that is presented throughout the video. In some embodiments, the text extracted from the video is presented to the user, for example, in a pop-up window, together with data indicating the times at which the text was presented in the video.

In some embodiments, automatic triggers can be performed based on the extracted text. For example, a particular action can be performed when the extracted text matches a particular word. In one example, if the extracted text matches text that was included in a blacklist, e.g., copyright protection or age appropriateness, then the media from which the text was extracted is prevented from being displayed in the interface 202. In another example, a particular application can be launched in response to the extracted text matching a particular pattern or word. For example, an application for initiating phone calls can be launched when the extracted text matches a phone number pattern.

Figure 3:
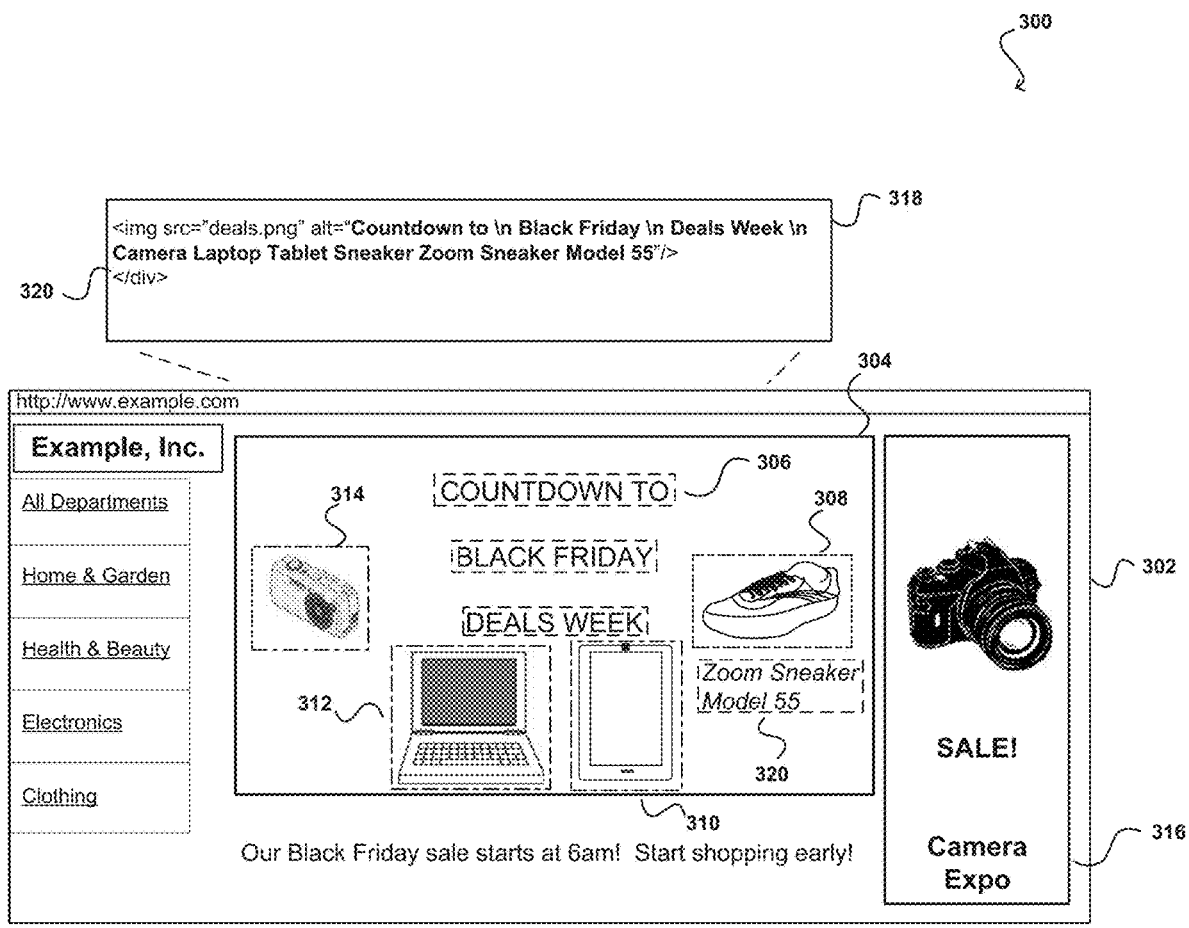
FIG. 3 illustrates an example interface that is presenting content that is processed for enhancing electronic advertising.

FIG. 3 illustrates an example interface 302 that is presenting content that is processed for enhancing electronic advertising. For example, the interface 302 is a graphical user interface of a software application, e.g., a web browser, that is running on a computing device, e.g., the computing device 702, as described in reference to FIG. 7. The software application can be configured to obtain content from a resource, e.g., a web server, and to render that content on a display screen of the computing device.

In FIG. 3, the interface 302 is presenting content that was obtained from the website that was described in reference to FIG. 1. However, in FIG. 3, the website has been processed to extract data, e.g., text and objects from images, e.g., the image 304, in the website. The website content in FIG. 3 is presented in the interface 302 and has an image 304 that includes text 306 and objects 308, 310, 312, and 314.

In some embodiments, the website content presented in the interface 102 is processed using various techniques, as described below, to extract text and objects in the images. The extracted text and objects can then be used to identify relevant electronic advertisements ("ads") to be presented along with the content. For example, keywords in the extracted text 306 can be used to determine the type of content that is being presented in the website, e.g., "Black Friday Deals." These keywords can then be used to identify relevant ads to be placed in the website. The keywords can also be used to identify categories for the content and the identified categories can be used to obtain relevant ads.

In some embodiments, the objects, e.g., the objects 308, 310, 312, and 314, extracted from the image 304 are also used to identify relevant ads. For example, in some embodiments, various object recognition techniques can be used to extract and identify the objects, for example, as a particular product, a logo, or a type of object. Upon identification, tags, e.g., keywords, that are associated with the identified objects can also be associated with the media in which the objects were identified. For example, relevant tags for an image can be associated with the image's metadata. The tags can be used identify relevant ads to be placed in the website, as described above. For example, if a website includes an image of a particular automobile, then the image can be processed to obtain tags that are associated with the particular automobile. The obtained tags can then be used to identify, for example, an ad for a local car dealership that sells the particular automobile.

In some instances, media, e.g., images, in websites may include multiple objects. For example, an image may show a famous bridge, a particular car logo, and some text. In such instances, the association of tags with the image may be determined based on the confidence, e.g., similarity score, of the object recognitions. If the recognition confidence of an object satisfies a threshold value, then tags corresponding to the identified object can be associated with the image. For example, if the famous bridge and the particular car logo are both identified in the image with a respective confidence that satisfies a threshold value, then tags for both the famous bridge and the particular car logo can be associated with the image. Similarly, the text in the image can be extracted and, if the confidence of the text extraction satisfies a threshold value, then the text can also be associated with the image.

In some embodiments, a logo recognition technique or an ImageMatch technique can be used to extract features from images. For example, the system can extract features from each of the images using a feature extraction algorithm (e.g., Accumulated Signed Gradient) and transform the extracted features for each image into feature descriptors which can be subsequently stored and used to compare against query images submitted by users or otherwise obtained. Though the size of each feature descriptor representation may not be particularly large, the total number of these descriptors (e.g., 80 million+) can require a substantial amount of storage space. Accordingly, in at least one embodiment, one or more feature of these descriptor representations are compressed, such as by clustering the features of a given feature descriptor representation, using a center of each respective cluster as an approximation of the associated features, and encoding information for the cluster centers with fewer bits than the original cluster center representation to generate a minimized descriptor representation, which can help to minimize storage. Such a compression technique may also minimize run-time latency compared to previous techniques since the files now being retrieved and compared are relatively smaller.

In at least one embodiment, the compression can be achieved by clustering one or more feature descriptors, approximating each of a number of feature descriptors of a respective cluster as a cluster center, and encoding the cluster centers using fewer bits than the original cluster center. For example, a Hierarchical K-means (HKM) algorithm can be used to cluster the feature descriptors, and, after clustering, the cluster centers can each be assigned a visual word to textually describe each respective image (i.e., Bag-of-Words). Any type of compression (e.g., lossy compression, lossless compression, etc.) can be used to reduce the number of bits. An index of these visual words that maps each visual word to its corresponding images can be generated and made available for image matching.

Accordingly, upon receiving a query image (e.g., an image submitted by a user via a computing device), feature descriptors of features from the query image can be extracted and visual words assigned thereto. Each visual word representing the query image can then be compared against the visual words stored in the index of visual words by a search engine in a manner similar to that employed by text retrieval techniques. As a result, a set of closest matching inventory images that at least partially match the query image can be determined based at least in part upon matching visual words. Since this set of closest matching inventory images is determined by comparing visual words, these images can be geometrically verified by comparing cluster centers of each image with their respective matches using a geometric verification algorithm (e.g., RANdom SAmple Consensus algorithm).

Compressing feature descriptors can, therefore, be a means of addressing storage scalability for a system. However, this method can be susceptible to performance degradation and information loss as features are approximated by their cluster centers, as these clusters are compressed into smaller clusters, and as bits are removed. In at least one embodiment, a machine learning technique can be used to attempt to compensate for this information loss by considering such factors as consistent orientate on differences, scale differences, and the like.

In some embodiments, the tags that are associated with media in a website are used to obtain relevant electronic ads, for example, from an ad network, to be presented in the website. In some embodiments, the markup language code for the website is updated, as described above, to include the tags that are associated with media in the website, as shown in the example portion 318 of markup language code.

For example, in FIG. 3, the image 304 has been processed to identify and associate the extracted text 306, i.e., "Countdown to Black Friday Deals Week," and respective tags that correspond to object 308, i.e., "Sneaker," object 310, i.e., "Tablet," object 312, i.e., "Laptop," and object 314, i.e., "Camera." The tags associated with the image 304 or included in the markup language code of the website 318 can be used to obtain and present relevant electronic ads, e.g., the ad 316 referencing a Camera Expo sale.

In some embodiments, tags associated with an identified object, e.g., the object 310, can be included in the markup language code for the website 318 so that the tags are displayed to users interacting with the website 318. For example, in FIG. 3, a tag 320, i.e., "Zoom Sneaker Model 55," that identifies the object 310 is shown in the website. A user can interact with the website 318 to select the tag.

Figure 4:
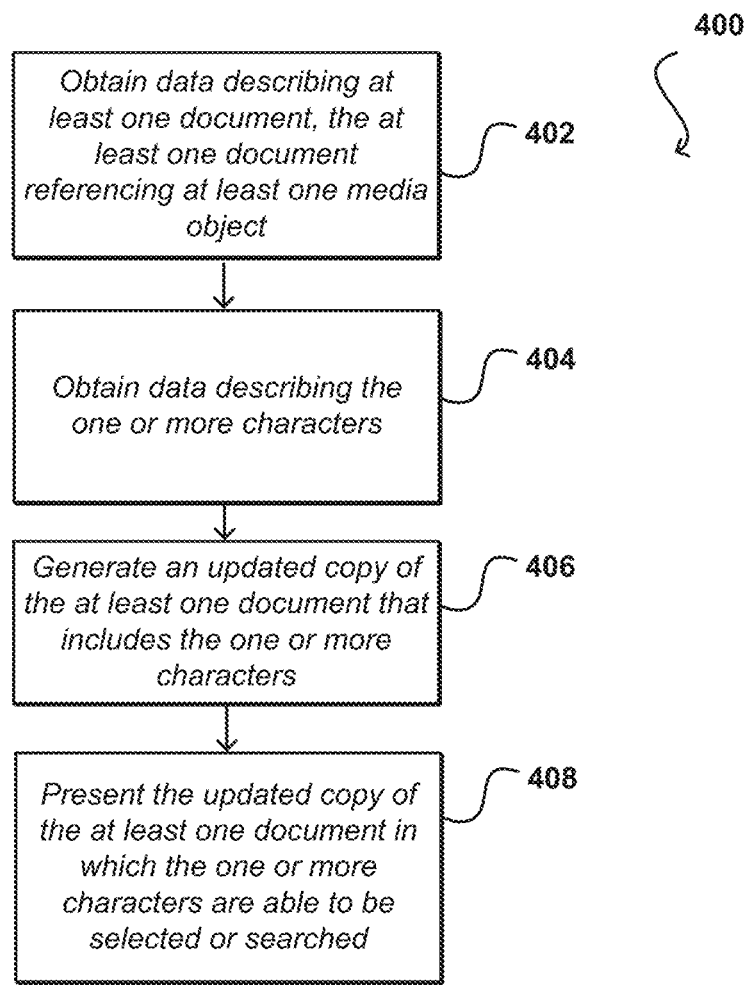
FIG. 4 illustrates a flow diagram of an example process for allowing text in a media object to be selected or searched.

FIG. 4 illustrates a flow diagram of an example process 400 for allowing text in a media object to be selected or searched. The example process 400 is provided merely as an example and additional or fewer steps may be performed in similar or alternative orders, or in parallel, within the scope of the various embodiments described in this specification.

A computing device obtains data describing at least one document. The document can reference at least one media object and a portion of the at least one media object can include one or more characters 402.

The computing device can obtain data describing the one or more characters in the at least one media object 404. For example, the computing device can request extraction of the one or more characters using an optical character recognition (OCR) technique 404. The computing device can generate an updated copy of the at least one document that includes the data describing the one or more characters in the at least one media object 406. The computing device can present, on a display screen of the computing device and through an interface, the updated copy of the at least one document 408. When presented, the one or more characters in the at least one media object are able to be selected or searched.

Figure 5:
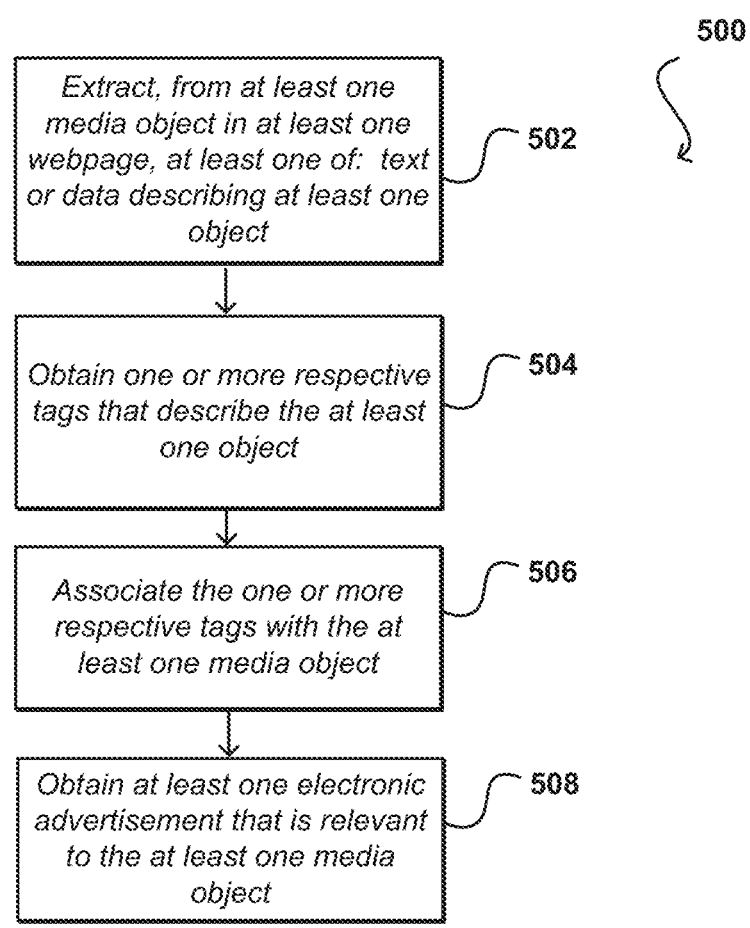
FIG. 5 illustrates a flow diagram of an example process for processing media objects in a webpage to obtain electronic advertisements that are relevant to the media objects.

FIG. 5 illustrates a flow diagram of an example process 500 for processing media objects in a webpage to obtain electronic advertisements that are relevant to the media objects. The example process 500 is provided merely as an example and additional or fewer steps may be performed in similar or alternative orders, or in parallel, within the scope of the various embodiments described in this specification.

A computing device extracts, from at least one media object in at least one webpage, at least one of: text or data describing at least one object 502.

The computing device can obtain, based at least in part on the data describing the at least one extracted object, one or more respective tags that describe the at least one object 504. The computing device can associate the one or more respective tags with the at least one media object. For example, the tags can be associated in the metadata of the at least one media object or with the at least one webpage.

The computing device can obtain, based at least in part on the one or more respective tags or on the text extracted from the at least one media object, at least one electronic advertisement that is relevant to the at least one media object 508.

Figure 6:
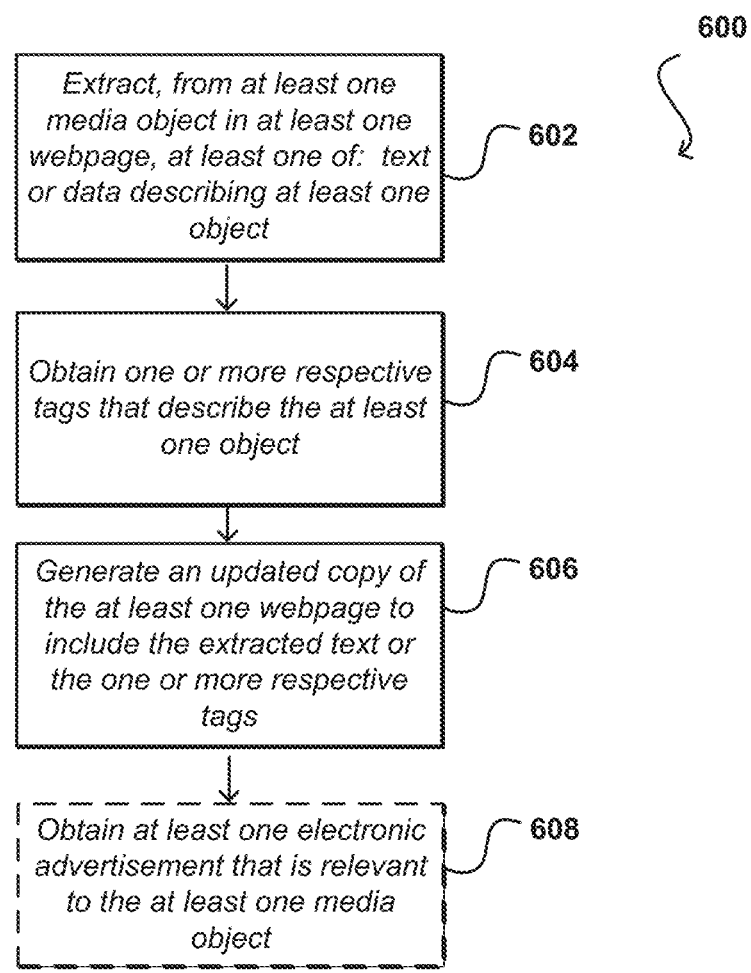
FIG. 6 illustrates another flow diagram of an example process for processing media objects in a webpage to obtain electronic advertisements that are relevant to the media objects.

FIG. 6 illustrates another flow diagram of an example process 600 for processing media objects in a webpage to obtain electronic advertisements that are relevant to the media objects. The example process 600 is provided merely as an example and additional or fewer steps may be performed in similar or alternative orders, or in parallel, within the scope of the various embodiments described in this specification.

A computing device can extract, from at least one media object in at least one webpage, at least one of: text or data describing at least one object 602.

The computing device can obtain, based at least in part on the data describing the at least one extracted object, one or more respective tags that describe the at least one object 604. The computing device can generate an updated copy of the at least one webpage to include the extracted text or the one or more respective tags 606.

Optionally, the computing device can obtain, based at least in part on extracted text or the one or more respective tags, at least one electronic advertisement that is relevant to the at least one media object.

Figure 7:
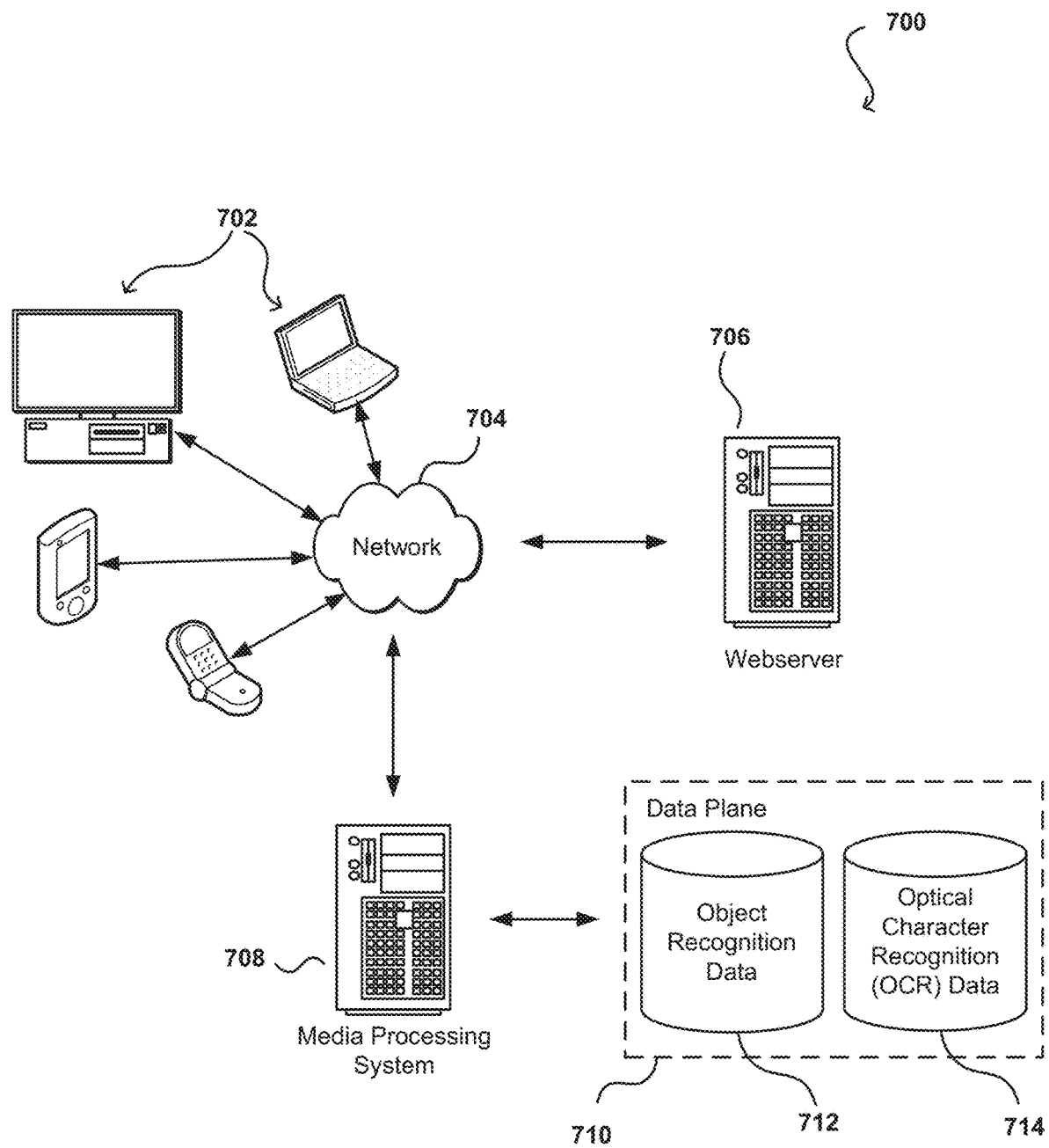
FIG. 7 illustrates an example of an environment for implementing aspects in accordance with various embodiments.

FIG. 7 illustrates an example of an environment 700 for implementing aspects in accordance with various embodiments. Although a web-based environment is described for purposes of explanation, different environments may be used, as appropriate, to implement various embodiments. The example environment 700 includes a webserver 706, a media processing system 708, and a data plane 710. The media processing system 708 is an example of a data processing system implemented as computer programs on one or more computers in one or more locations, in which the systems, components, and techniques described below can be implemented.

A user can interact with the webserver 706 and the media processing system 708 through a client device 702. For example, the client device 702 can be a computer coupled to the webserver 706 and the media processing system 708 through a data communication network 704, e.g., the Internet. The client device 702 generally includes a memory, e.g., a random access memory (RAM), for storing instructions and data, and a processor for executing stored instructions. The client device 702 can be any appropriate device operable to send and receive requests, messages, or other types of information over the network 704. The client device 702 can also include a display screen though which a user interacting with the client device can view information, e.g., website content. Some examples of client devices include personal computers, cellular phones, handheld messaging devices, laptop computers, set-top boxes, personal data assistants, electronic book readers, tablet devices, and the like.

The network 704 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The client device 702 can communicate over the network using wired or wireless connections, and combinations thereof.

A user can interact with a software application, e.g., a web browser, that is running on the client device 702 to access content, e.g., webpages, being hosted by the webserver 706. The software application can be configured to obtain the content from the webserver 706, and to render that content on a display screen of the client device 702. In some embodiments, once content is obtained from the webserver 706, the client device 702 can send the obtained content to the media processing system 708 for processing. The media processing system 708 can process the media, e.g., images and videos, in the content to extract text and objects from the media.

For example, in some embodiments, the media processing system 708 uses generally known text processing and OCR techniques, together with OCR data 714, to extract text from the media. The OCR data 714 can include application-specific data that optimizes character recognition based on the type of content being processed, e.g., characters written in a particular language. The OCR techniques can be optimized to recognize various types of text.

For example, the OCR techniques can be optimized to recognize born-digital text. In some embodiments, the media processing system 708 can apply machine learning techniques to determine that certain OCR techniques should be applied to particular Uniform Resource Locators (URLs) for websites that contain a particular type of text. For example, the media processing system 708 can determine that websites having URLs that end in ".ru" contain text written in Russian and, consequently, the media processing system 708 can be configured to apply OCR techniques that are optimized for Russian character detection for media in websites that have such URLs. Similarly, the media processing system 708 can apply machine learning techniques to evaluate the content of a website to select OCR techniques that should be applied when extracting text from media in the website. In some embodiments, the media processing system 708 is configured to not perform OCR techniques on media in websites having URL patterns, e.g., URLs that reference products for sale, that generally do not contain text in the media. In some embodiments, text extraction for particular media in websites can be performed and cached while a website is loading. For example, the client device 702 or the media processing system 708 can be configured to identify media in websites or certain hyperlinks that are likely to be selected by a user as determined based on the user's previously behavior, the behavior of a collection of users, or the behavior of a collection of users that are similar to the user.

In some embodiments, the media processing system 708 is able to identify objects in the media by applying, for example, generally known object recognition techniques and using the object recognition data 712. The object recognition data 714 can include, for example, associations of various objects and tags. For example, a logo of a car manufacturer can be associated with the name of the car manufacturer.

Once the media in the content has been processed, the media processing system 708 can send extracted text, data describing identified objects, or both, to the client device 702. The client device 702 can generate updated markup language code for the content that includes the extracted text, for example, as an invisible overlay on top of the media from which the text was extracted, as described above.

In some embodiments, the webserver 706 can interact with the media processing system 708 to pre-process its website content. The media processing system 708 can process the website content to identify media, e.g., images and videos, in the website content, and to extract text and objects from the media. The media processing system 708 can generate updated markup language code for the website content that includes the extracted text as an invisible overlay on top of the media from which the text was extracted, as described above. The webserver 706 can deploy the updated markup language code to allow the extracted text to be selected or searched. In some embodiments, the webserver 706 is configured to interact with the media processing system 708 to pre-process website content at specified time intervals or manually upon request. In some embodiments, the webserver 706 is configured to interact with the media processing system 708 to pre-process website content when the website has been updated, for example, when new media has been added to the website content or media has been deleted from the website content. Optionally, if the website content includes ads, such ads can be ignored for purposes of text extraction and the markup language code for the website content need not be updated in such instances.

In some embodiments, the media processing system 708 operates as a proxy server that is configured to download website content, for example, from the webserver 706, and to generate updated markup language code for text that was extracted from the website content as an invisible overlay on top of the media from which the text was extracted, as described above. In such embodiments, the client device 702 can interact with the media processing system 708 to access website content being hosted by the webserver 706 that has been updated to include invisible overlays for text that was extracted from the website content being hosted by the webserver 706.

In some embodiments, a language translation server may be used to translate the website content being hosted by the webserver 706. In such embodiments, the language translation server can be configured to send the website content being translated to the media processing system 708 for media text extraction, extraction of objects in media, or both.

The media processing system 708 can generate updated markup language code for text that was extracted from the website content, for example, as an invisible overlay on top of the media from which the text was extracted, as described above. The language translation server can incorporate the generated updated markup language code that was received from the media processing system 708 into the markup language code for the translated website content so that the extracted text can be selected and searched.

In some embodiments, the web browser running on the client device 702 is configured to perform the operations of the media processing system 708, as described above.

Depending on the embodiment, various optimizations may be implemented in the example environment 700. For example, in some embodiments, the media processing system 708 is configured to cache text that is extracted from media in website content, and to provide the cached text in response to subsequent requests for processing the website content until the media has been updated. For example, the media processing system 708 can be configured to maintain MD5 checksums for images in the website content. When a request to process website content is received, the media processing system 708 can evaluate the MD5 checksum of an image in the website content to determine that text from the image was previously extracted and cached. In response, the media processing system 708 can provide the cached version of the extracted text instead of again extracting text from the image. In instances where the MD5 checksum of the image does not match a checksum of an image from which text was previously extracted, the media processing system 708 can then process the image to extract text using the techniques described above.

Since OCR and object recognition can be computationally intensive, in some instances the number of times OCR and objection recognition is performed can be reduced by introducing machine learning techniques or using manually-designed rules. For example, based on statistics from previous OCR results, the media processing system 708 is able to identify Uniform Resource Locators (URLs) for websites that include media that generally does not contain text. The media processing system 708 can be configured to not perform OCR on images in the identified URLs, to perform OCR on a specified number of the images in the identified URLs, or to perform OCR on a specified percentage of the images in the identified URLs, for example. Other variations are possible. For example, the media processing system 708 can perform OCR on a randomly selected number of images in the identified URLs.

In some embodiments, thresholds used for OCR techniques can be adjusted depending on the text extraction results for media in a particular website. For example, if text extraction from images in a website is resulting in the extraction of actual text, and not garbage, then thresholds used for OCR techniques being applied to the website can be reduced. Naturally, the thresholds used for OCR techniques being applied to the website can be increased if text extraction from images in the website is resulting in the extraction of garbage, and not actual text. In some embodiments, the formatting of website content can be used to optimize OCR techniques. For example, if a certain website uses a particular font, font color, or font size, then OCR techniques being applied to media in the certain website can be optimized to process text that is in the particular font, font color, or font size. In some embodiments, OCR techniques can be customized for individual websites to improve accuracy. For example, a particular website may have a custom OCR configuration that is based on the language used in the website, a custom dictionary for the website, website zone, and a speed versus accuracy tradeoff that has determined to be acceptable for the website.

In some embodiments, the client device 702 is configured to determine that a user is attempting to select text in media included in a particular website and, in response, process the media to extract text. Depending on the implementation, the client device 702 can send the media to the media processing system 708 for text extraction or the client device 702 itself can process the media to extract the text, as described above. For example, JavaScript code may be implemented to detect that the user is attempting to select text in an image. Such JavaScript code may also be implemented in the media processing system 708 to allow the media processing system 708 to detect such events, and to perform text extraction for the corresponding media.

In some embodiments, the web server 706, the media processing system 708, and similar components, can be considered to be part of the data plane 710. The handling of all requests and responses, as well as the delivery of content between the client device 702 and the media processing system 708, can be handled by the web server 706. The web server 706 and media processing system 708 are merely example components. However, more or fewer components can be used as structured code can be executed on any appropriate device or host machine as discussed elsewhere herein.

The data plane 710 includes one or more resources, servers, hosts, instances, routers, switches, data stores, other similar components, or a combination thereof. The resources of the data plane 710 are not limited to storing and providing access to data. Indeed, there may be several product servers, layers, or other elements, processes, or components, which may be chained or otherwise configured, and which can interact to perform tasks including, for example, obtaining data from an appropriate data store. As used in this specification, the term "data store" refers to any device or combination of devices capable of storing, accessing, and retrieving data, which may include any combination and number of data servers, databases, data storage devices, and data storage media, in any standard, distributed, or clustered environment.

The data stores of the data plane 710 can include several separate data tables, databases, or other data storage mechanisms and media for storing data relating to a particular aspect. For example, the data plane 710 illustrated includes mechanisms for facilitating text recognition and object recognition. The data plane 710 is also shown to include a mechanism for storing log data, which can be used for purposes such as reporting and analysis. The data plane 710 is operable, through logic associated therewith, to receive instructions from the media processing system 708 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment including several computer systems and components that are interconnected through one or more communication links, using one or more computer networks or direct connections. However, the system described above can be configured to operate equally well using fewer or a greater number of components than are illustrated in FIG. 7. Thus, the system 700 in FIG. 7 is provided merely as one example, and does not limit the scope of the disclosure.

Figure 8:
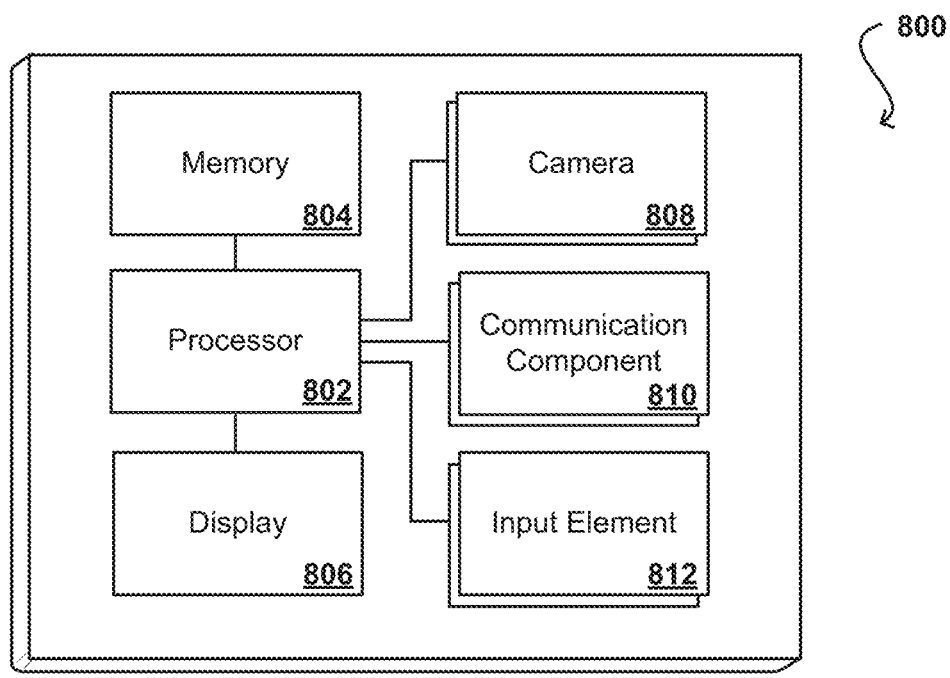
FIG. 8 illustrates example components of an example computing device that can be to implement aspects of various embodiments.

FIG. 8 illustrates a logical arrangement of a set of general components of an example computing device 800. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server (s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising
one or more processors; and
memory storing instructions that, when executed by the one or more processors, cause the one or more processors to perform operations, comprising:
generating content to be displayed on a display of the system;
determining font information from non-selectable text that is within an image of the content;
extracting text from at least a portion of the non-selectable text;
adjusting the extracted text using the font information;
obtaining a tag that is associated with at least one object and with the extracted text from the image;
automatically generating an updated copy of the content by at least an update to code associated with the content, the updated copy to include the tag and to include the extracted text as an invisible overlay that is selectable over the content; and
causing the updated copy of the content to be presented.

2. The system of claim 1, where the instructions that, when executed by the one or more processors, cause the one or more processors to perform further operations, comprising:
identifying content that comprises one or more of a location, an action, a user behavior, a user preference, an open application, a submitted request, or a received call; and
capturing the content to be provided to a data store and to be used to perform the determining of the font information there from.

3. The system of claim 1, wherein the content is a document and the tag is associated with a reference that is within a markup language code of the document.

4. The system of claim 1, where the instructions that, when executed by the one or more processors, cause the one or more processors to perform further operations, comprising:
updating markup language code associated with the content to include the data and the tag using an "alt" attribute or a "div" tag.

5. A computer-implemented method, the method comprising:
generating content to be displayed on a display of the system;
determining font information from non-selectable text that is within an image of the content;
adjusting extracted text from at least a portion of the non-selectable text using the font information;
obtaining a tag that is associated with at least one object and with the extracted text from the image;
automatically generating an updated copy of the content by at least an update to code associated with the content, the updated copy to include the tag and to include the extracted text as an invisible overlay that is selectable over the content; and
causing the updated copy of the content to be presented.

6. The computer-implemented method of claim 5, further comprising:

identifying content that comprises one or more of a location, an action, a user behavior, a user preference, an open application, a submitted request, or a received call; and capturing the content to be provided to a data store and to be used to perform the determining of the font information there from.

7. The computer-implemented method of claim 5, further comprising:

enabling selection of the at least one portion of the text for further interaction with the content.

8. The computer-implemented method of claim 5, further comprising:

enabling options for user interaction with the text based in part on section of the at least one portion of the text.

9. The computer-implemented method of claim 5, further comprising:

enabling in-place text replacement of the text the at least one portion of the text.

10. The computer-implemented method of claim 5, further comprising:

displaying mouse-over prompts for options associated with the at least one portion of the text.

11. The computer-implemented method of claim 5, further comprising:

generating the updated copy of the content with the at least one portion of the text in a language associated with a user.

12. The computer-implemented method of claim 5, further comprising:

determining that at least one second portion of the text matches a specified keyword included in a blacklist; and generating a second copy of the content to prevent at least the one second portion of the text from being included in the code associated with the content.

13. A non-transitory computer-readable storage medium including instructions that, when executed by at least one processor of a computer system, cause the computer system to perform operations comprising:

generating content to be displayed on a display of the system;

determining font information from non-selectable text that is within an image of the content;

adjusting extracted text from at least a portion of the non-selectable text using the font information;

obtaining a tag that is associated with at least one object and with the extracted text from the image;

automatically generating an updated copy of the content by at least an update to code associated with the content, the updated copy to include the tag and to include the extracted text as an invisible overlay that is selectable over the content; and causing the updated copy of the content to be presented.

14. The non-transitory computer-readable storage medium of claim 13, wherein the operations further comprise:

identifying content that comprises one or more of a location, an action, a user behavior, a user preference, an open application, a submitted request, or a received call; and capturing the content to be provided to a data store and to be used to perform the determining of the font information there from.

15. The non-transitory computer-readable storage medium of claim 13, wherein the operations further comprise:

enabling selection of the at least one portion of the text for further interaction with the content.

16. The non-transitory computer-readable storage medium of claim 13, wherein the operations further comprise:

enabling options for user interaction with the text based in part on section of the at least one portion of the text.

17. The non-transitory computer-readable storage medium of claim 13, wherein the operations further comprise:

displaying mouse-over prompts for options associated with the at least one portion of the text.

18. The non-transitory computer-readable storage medium of claim 13, wherein the operations further comprise:

converting the at least one portion of text to a language that is a user's preferred language.

19. The non-transitory computer-readable storage medium of claim 13, wherein the content is a document and the tag is associated with a reference that is within a markup language code of the document.

20. The non-transitory computer-readable storage medium of claim 13, wherein the operations further comprise:

determining that at least one second portion of the text matches a specified keyword included in a blacklist; and generating a second copy of the content to prevent at least the one second portion of the text from being included in the code associated with the content.

\* \* \* \* \*